(12) United States Patent
Kersters

(10) Patent No.: US 7,478,375 B1
(45) Date of Patent: Jan. 13, 2009

(54) DIRECTED ACYCLIC GRAPH (DAG) EXPLORATION THROUGH SEPARATION OF CONCERNS

(75) Inventor: Christian Kersters, Donceel (BE)

(73) Assignee: Computer Associates Think, Inc., Islandia, NY (US)

(*) Notice: Subject to any disclaimer, the term of this patent is extended or adjusted under 35 U.S.C. 154(b) by 563 days.

(21) Appl. No.: 10/852,772

(22) Filed: May 21, 2004

Related U.S. Application Data

(60) Provisional application No. 60/564,816, filed on Apr. 23, 2004.

(51) Int. Cl.
G06F 9/45 (2006.01)
(52) U.S. Cl. ............... 717/144; 717/146; 717/154; 717/155; 717/156
(58) Field of Classification Search ........... 717/101, 717/104, 108, 116, 143, 144, 146, 154, 155, 717/156; 707/101
See application file for complete search history.

(56) References Cited

U.S. PATENT DOCUMENTS

| | | | |
|---|---|---|---|
| 6,105,018 A | | 8/2000 | Demers et al. |
| 6,279,149 B1 * | | 8/2001 | Field et al. ............... 717/129 |
| 6,369,819 B1 | | 4/2002 | Pitkow et al. |
| 6,467,086 B1 | | 10/2002 | Kiczales et al. |
| 6,473,895 B1 | | 10/2002 | Lopes et al. |
| 6,539,390 B1 | | 3/2003 | Kiczales et al. |
| 6,611,843 B1 | | 8/2003 | Jacobs |
| 6,681,221 B1 * | | 1/2004 | Jacobs ........................ 707/5 |
| 7,137,104 B2 * | | 11/2006 | Tip et al. ................... 717/116 |
| 2003/0221182 A1 * | | 11/2003 | Tip et al. ................... 717/116 |
| 2005/0065955 A1 * | | 3/2005 | Babikov et al. ............ 707/101 |
| 2005/0071806 A1 * | | 3/2005 | Sreedhar .................... 717/104 |
| 2005/0166193 A1 * | | 7/2005 | Smith et al. ................ 717/143 |
| 2005/0210441 A1 * | | 9/2005 | Tarr et al. .................. 717/101 |
| 2005/0216885 A1 * | | 9/2005 | Ireland ...................... 717/108 |

OTHER PUBLICATIONS

Rashid et al., "Object Database Evolution using Separation of Concerns," pp. 26-33, ACM, Dec. 2000.*
Kienzle et al., "On Composition and Reuse of Aspects," pp. 1-8, McGill University, Feb. 2003.*
Schonger et al., "Aspect-Oriented Programming and Component Weaving:Using XML Representations of Abstract Syntax Trees," pp. 1-7, ACM, 2002.*
Lieberherr, "Traversals of object structures: Specification and Efficient Implementation," pp. 370-412, ACM, Mar. 2004.*
Ishio et al., "Program slicing tool for effective software evolution using aspect-oriented technique," pp. 1-10, IEEE, 2002.*

(Continued)

Primary Examiner—Lewis A. Bullock, Jr.
Assistant Examiner—Insun Kang
(74) Attorney, Agent, or Firm—Pillsbury Winthrop Shaw Pittman LLP

(57) ABSTRACT

A method for concern-based processing of a directed acyclic graph (DAG) using aspect-oriented programming includes instantiating a plurality of aspects, each aspect associated with one concern for processing one or more DAGs, each DAG comprising a plurality of nodes. One of the DAGs is selected for processing and processed based on at least a portion of the instantiated aspects.

13 Claims, 2 Drawing Sheets

OTHER PUBLICATIONS

Robillard et al., "Concern graphs: finding and describing concerns using structural program dependencies,", pp. 1-11, ACM, 2002.*

Masuhara et al., "Modeling Crosscutting in Aspect-Oriented Mechanisms," pp. 1-27, SpringerLink, Aug. 2003.*

Rashid, "A Hybrid Approach to Separation of Concerns: The Story of SADES," pp. 1-19, SpringerLink, Sep. 2001.*

Klang, "XML and the art of code maintenance," pp. 1-32, Mulberrytech, 2003.*

* cited by examiner

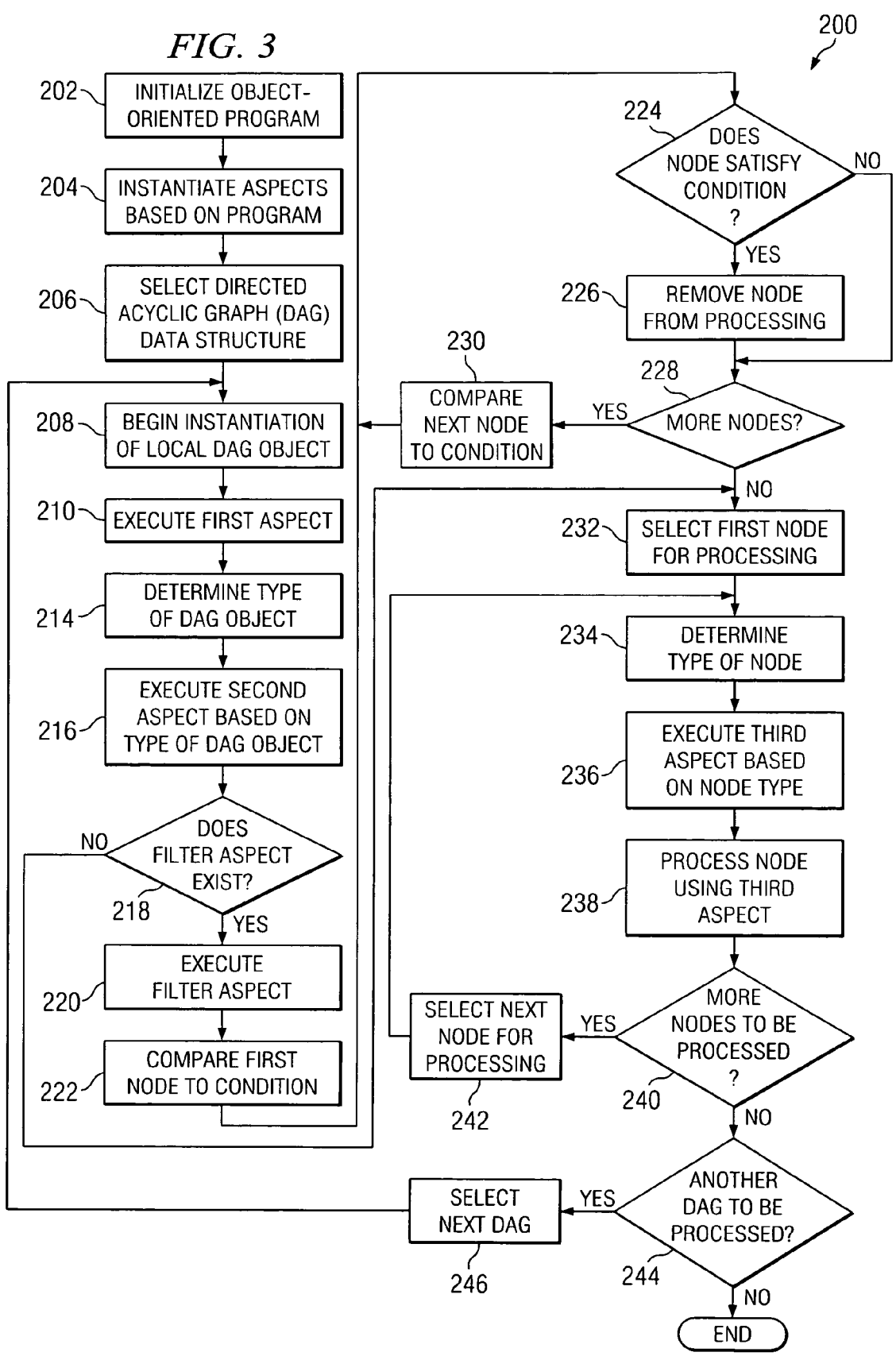

DIRECTED ACYCLIC GRAPH (DAG) EXPLORATION THROUGH SEPARATION OF CONCERNS

RELATED APPLICATION

This application claims the priority under 35 U.S.C. §119 of provisional application Ser. No. 60/564,816 filed Apr. 23, 2004.

TECHNICAL FIELD

This disclosure relates generally to the field of aspect-oriented processing and, more specifically, to directed acyclic graph exploration through separation of concerns.

BACKGROUND

Concerns are particular concepts, pieces of functionality, or shared interests. In software, some concerns (termed crosscutting concerns) affect multiple modules, classes, and such. Crosscutting concerns typically result in programs that are harder to design, debug, implement, and modify. These problems are commonly due to issues referred to as tangling (multiple concerns in one module) or scattering (one concern spanning multiple modules). Separating concerns in software development is an abstraction mechanism used to provide cleaner views of relationships and common functionality between modules. For example, concerns may be separated based on common functionality or modules with narrow interfaces. A new programming element, called an aspect, was developed to provide encapsulation of an individual concern. Conventional object-oriented programming languages are beginning to incorporate aspect-oriented programming components.

SUMMARY

This disclosure provides a system and method for concern-based processing of a directed acyclic graph (DAG) using aspect-oriented programming. In one embodiment, the method includes instantiating a plurality of aspects, each aspect associated with one concern for processing one or more DAGs, each DAG comprising a plurality of nodes. One of the DAGs is selected for processing and processed based on at least a portion of the instantiated aspects.

In another embodiment, the method includes instantiating a plurality of aspects, the plurality of aspects comprising a first aspect for determining the structure of the DAG, a second aspect operable to compare each of a subset of the plurality of nodes to a condition and remove each node satisfying the condition from the subset, and a third aspect for processing the subset based on the determined structure of the DAG and a type of each of the subset of the nodes, the third aspect comprising an extension of the first aspect. A particular one of the DAGs is selected and processed based on at least the first and third aspects.

DESCRIPTION OF DRAWINGS

FIG. 3 is a flowchart illustrating an example method for processing of a DAG using separated concerns in aspect-oriented programming in accordance with one embodiment of the present disclosure.

DETAILED DESCRIPTION

Figure 1:
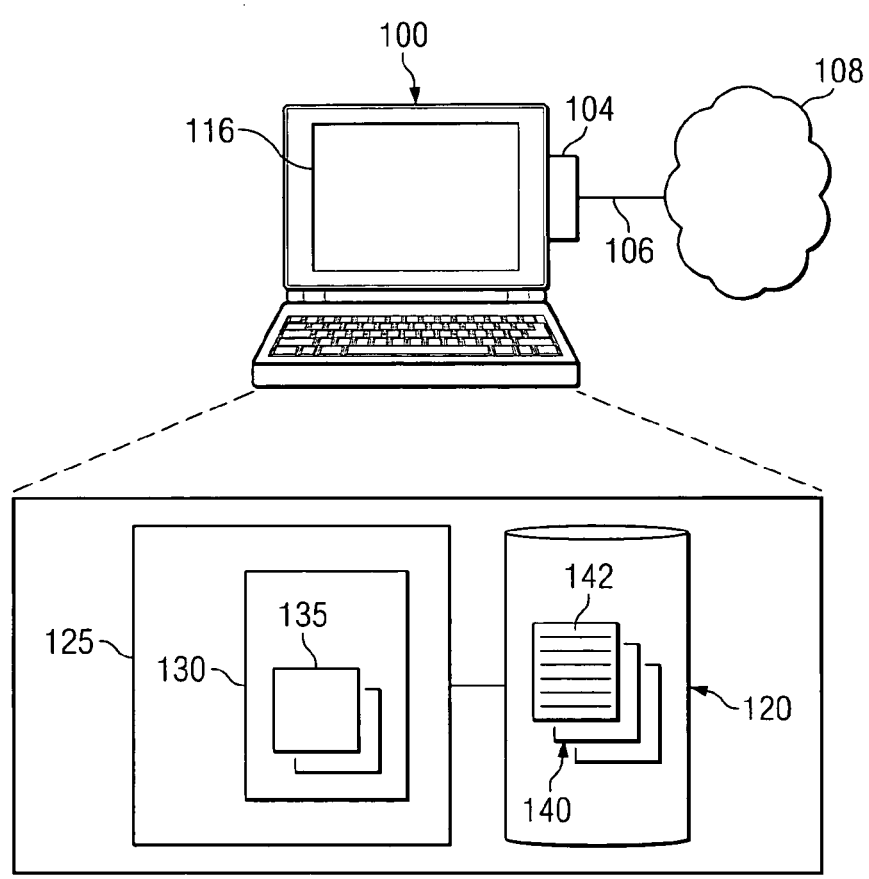
FIG. 1 illustrates an example system for processing a directed acyclic graph (DAG) using separated concerns in aspect-oriented programming in accordance with one embodiment of the present disclosure.

FIG. 1 is a block diagram illustrating a computer system 100 for effective exploration of directed acyclic graphs (DAGs) through separation of concerns. In general, the present disclosure contemplates any system 100 that provides systematic and effective exploration of DAGs (with typeless vertices as well as typed vertices) by identifying and separating concerns in DAG exploration algorithms. In one embodiment, the logical and programmatic concerns include: i) how to explore a DAG; ii) what is the structure of the DAG that needs to be explored (selected types of nodes and vertices); and iii) what to do with the information available whenever nodes of specific types are reached. This separation of concerns may provide or allow for more effective development and maintenance, thereby reducing development time, costs, and risks. Accordingly, computer 100 may comprise a portion of an object-oriented information management system operable to retrieve a plurality of data objects from a DAG file 140 and process the retrieved graph objects according to the separated concerns, each defined in an aspect module. For example, system 100 may include a DAG module 130 that retrieves DAG 140 stored in a database and dynamically explores and processes DAG 140 according to the various pre-defined aspects. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that the appropriate processing is determined at least partially at run-time based on one or more variables such as, for example, a filtering parameter or condition or a type of each DAG 140 or component node 142. As used herein, the term "each" means every one of at least a subset of the data objects.

Computer system 100 includes graphical user interface 116, memory 120, processor 125, and an input device such as a keyboard, mouse, or touch screen. The illustrated system 100 also includes DAG module 130 and one or more DAG files 140 that may be stored in memory 120 and executed or processed by processor 125. At a high level, as used in this document the term "computer" is intended to encompass a personal computer, workstation, server network computer, mainframe or any other suitable processing device. Moreover, "computer system 100" and "user of computer system 100" may be used interchangeably, as appropriate, without departing from the scope of this disclosure. Computer system 100 may execute any operating system including UNIX, WINDOWS™, Linux, and others. FIG. 1 only provides one example of a computer that may be used with the disclosure. The present disclosure contemplates computers other than general purpose computers as well as computers without conventional operating systems.

Graphical user interface (GUI) 116 comprises, at least, a graphic user interface operable to allow the user of computer 100 to interact with one or more processes executing on computer 100. Generally, GUI 116 provides the user of computer 100 with an efficient and user-friendly presentation of data provided by computer 100 or network 108. GUI 116 may comprise a plurality of displays having interactive fields, pull-down lists, and buttons operated by the user. In one example, GUI 116 presents an explorer-type interface and receives commands from the user. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 100 and efficiently presents the information to the user. Network 108 can accept data from the user of computer 100 via the web browser (e.g., MICROSOFT™ INTERNET EXPLORE™ or NETSCAPE™ NAVIGATOR™) and return the appropriate HTML, JAVA™, or eXtensible Markup Language (XML) responses.

Computer 100 may include an interface 104 for communicating with other computer systems over network 108 such as, for example, in a client-server or other distributed environment via link 106. Network 108 facilitates wireless or wireline communication between computer system 100 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 104 comprises logic encoded in software and/or hardware in a suitable combination and operable to communicate with network 108 via link 104. More specifically, interface 104 may comprise software supporting one or more communications protocols associated with link 104 and communications network 108 hardware operable to communicate physical signals.

Memory 120 may include any memory, hard drive, or database module and may take the form of volatile or non-volatile memory including, without limitation, magnetic media, optical media, random access memory (RAM), read-only memory (ROM), removable media, or any other suitable local or remote memory component. Illustrated memory 120 stores, or includes references to, one or more DAG files 140. Generally, each DAG file 140 is only file or data structure including at least one directed acyclic graph object of any appropriate data type. For example, DAG files 140 may comprise one or more tables stored in a relational database described in terms of SQL statements or scripts. In another embodiment, DAG files 140 may store or define the DAG objects as XML documents, flat files, Btrieve files, or comma-separated-value (CSV) files. While each DAG file 140 may include more than one DAG object, DAG file 140 and DAG object 140 may be used interchangeably, as appropriate, without departing from the scope of this disclosure. Typically, each DAG object 140 comprises a logical graph where no path begins and ends at the same vertex (hence "acyclic") such as, for example, XML tree structures, array trees, list structures, and others. DAG object 140 includes at least one logical node 142 of any of a plurality of data types. This disclosure also contemplates typeless nodes 142. Memory 120 may include any other suitable data or module without departing from the scope of this disclosure.

Processor 125 executes instructions and manipulates data to perform the operations of computer 100 and related modules, such as processing by DAG module 130. Although FIG. 1 illustrates a single processor 125 in computer 100, multiple processors 125 may be used and reference to processor 125 is meant to include multiple processors 125 where applicable.

DAG module 130 could include any hardware, software, firmware, logic, or combination thereof operable to systematically explore DAGs 140 (with typeless as well as typed nodes 142), by separating identified concerns. In one embodiment, the concerns may comprise: i) how to explore DAG 140; ii) what is the structure of DAG 140 that needs to be explored (selected types of nodes 142 and vertices 142), including pre-processing, processing, and post-processing, and iii) what to do with the information available whenever nodes 142 of specific types are reached, including pre-processing, processing and post-processing. DAG module 130 may also implement a filter concern for any refinement of an instance of the particular DAG structure 140 to appropriately process a specific case. DAG module 130 implements or encapsulates these various concerns using separated (but often related) aspects 135. It will be understood that an aspect is a subprogram that is associated with a specific property (or concern) of an object-oriented program and as that property varies, the effect ripples through the entire program. Often, each aspect 135 subprogram or module is used by one kind of compiler, often called an aspect weaver.

DAG module 130 may be written or described in any appropriate object-oriented or aspect-oriented computer language, including C, C++, JAVA™, Smalltalk, any suitable version of 4GL, and others, so long as DAG module 130 remains compatible with, communicably coupled with, or include the aspects. Further, it will be understood that while DAG module 130 is illustrated as a single multi-tasked module, the features and functionality performed by this module may be performed by multiple modules such as, for example, a object-oriented program and a plurality of aspects 135 representing a plurality of identified concerns. Moreover, while not illustrated, DAG module 130 may be a child or sub-module of another module without departing from the scope of this disclosure.

In one aspect of operation, concerns are first identified in a DAG exploration algorithm represented in, for example, an object-oriented program. Once identified, the concerns may be substantively removed from the object-oriented program and separately coded in aspect modules 135 to provide cleaner interfaces and quicker subsequent modifications. Upon completion, system 100 compiles the object-oriented program along with the new aspect modules 135 to create a new aspect-oriented module, illustrated as DAG module 130. After receiving a request from a user or based on some dynamic parameter, system 100 executes DAG module 130 to explore and/or process DAG object 140 stored in memory 120. Typically, aspects 135 are instantiated during program initialization. DAG module 130 processes or otherwise explores DAG object 140 based, at least in part, on the logic defined in the various objects and aspects 135, as described in more detail in FIG. 2.

Figure 2:
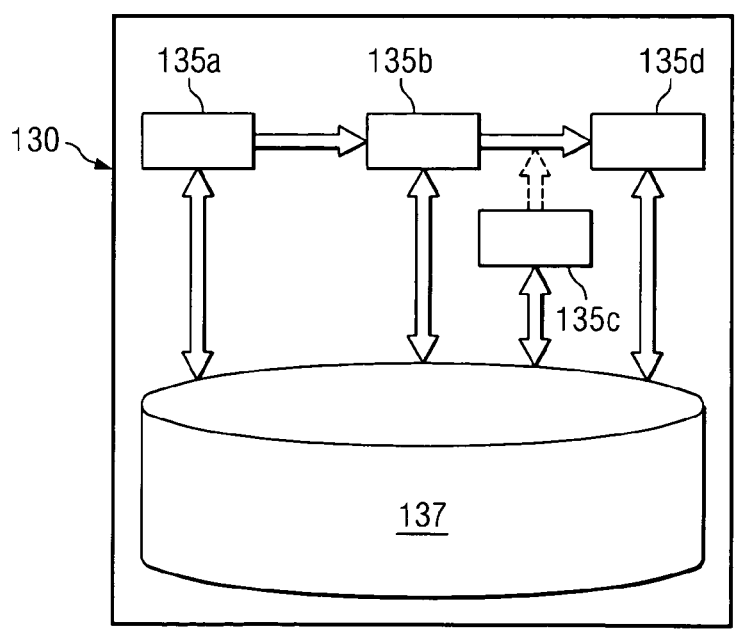
FIG. 2 illustrates an example embodiment of the DAG module illustrated in the system of FIG. 1.

FIG. 2 illustrates an example embodiment of DAG module 130 illustrated in system 100. Generally, this embodiment of DAG module 130 is an aspect-oriented program separating identified concerns for DAG exploration. For example, illustrated DAG module 130 includes four aspects: first aspect 135$a$, second aspect 135$b$, third aspect 135$c$, and fourth aspect 135$d$, respectively. In this embodiment, first aspect 135$a$ is an abstract base aspect, which defines how the DAG exploration code will take control over (or initiate processing) and the entry point for the next concern, i.e., second aspect 135$b$, to operate. First aspect 135$a$ may be associated with a generic abstract class, which defines the specific way the concern-based approach to DAG exploration will work its way through the DAGs 140. Second aspect 135$b$ comprises an exploration aspect and implements the second concern, which is specific to the type of DAG structure (or substructure) that needs to be explored. Second aspect 135b defines entry points for each type of node 142 traversed during the DAG 140 exploration. These entry points will make it possible for subsequent concerns to introduce code specific to the type of node 142. It may also define the rules of the exploration such as, for example, what to explore next, once a given type of node 142 has been reached. Second aspect 135b may be associated with an "explorer" class, which define the basic rules required to explore DAG 140, including how to find the one or more starting points for the exploration and how to move from the currently explored node 142 to the next node 142.

Third aspect 135c generally comprises an optional filtering aspect, which blocks further processing of certain nodes 142, whenever some predefined condition applies. Third aspect 135c encapsulates a structure refinement concern, typically used to provide limitations to the exploration, based on some information attached to the currently explored node 142. Fourth example aspect 135d implements the information processing concern. In other words, fourth aspect 135d typically comprises the definition of the information that has to be processed whenever node 142 of a given type is reached and when the exploration of that node 142 is finished. In one embodiment, this is accomplished by creating before( ) and after( ) advices associated with each entry point of interest defined at the basic structure level. These aspects 135 are for example purposes only and DAG module 130 may include none, some, or all of these example aspects 135, so long as appropriate concerns are identified and separated. DAG module 130 may be called or instantiated by another object-oriented program at any appropriate time. Moreover, illustrated DAG module 130 includes one or more local variables 137 such as, for example, objects, parameters, and others. While not required, these variables 137 may be used in appropriate manner, including public and private, at any suitable time.

FIG. 3 is a flowchart illustrating an example methods 200 for processing a DAG using the separated concerns. Generally, method 200 includes determining the structure of the DAG, filtering the DAG, and processing each node based on the determined type of DAG. The following description will focus on the operation of DAG module 130 (and the component aspects 135) in performing method 200. But system 100 contemplates using any appropriate combination and arrangement of logical elements implementing some or all of the described functionality.

Example method 200 begins at step 202, where system 100 initializes an object-oriented program, such as DAG module 130, including one or more aspects 135. Next, DAG module 130 instantiates these aspects 135 at step 204. Next, at step 206, DAG module 130 selects a DAG object 140, such as an XML tree or list array, from memory 120. At step 208, DAG module 130 begins loading the selected DAG object 140 and instantiates a local DAG object 137. Once loaded and instantiated, DAG module 130 begins processing DAG object 140 using the instantiated objects 137 in steps 210 through step 238.

After any appropriate amount of object-oriented processing, DAG module 130 executes first aspect 135a at step 210. Typically, first aspect 135a defines when the concern-based processing takes over, but may also include other generic logic. First aspect 135a then determines the type of DAG object 137 at step 214. Next, DAG module 130 executes second aspect 135b, at step 216, based on the determined type of DAG object 137. As described above, second aspect 135b may include any appropriate processing for the particular type of DAG object 137. Next, DAG module 130 determines if a filter aspect 135c exists at decisional step 218. If filter aspect 135c does exist, then DAG module 130 executes the filter aspect 135c at step 220. Next, at step 222, filter aspect 135c compares a first node 142 from loaded DAG object 140 to a predefined condition. If the node 142 satisfies the condition at decisional step 224, then filter aspect 135c removes node 142 from processing at step 226. Regardless, filter aspect 135c determines if there are more nodes 142 at decisional step 228. If there are more nodes 142 at step 228, then filter aspect 135c compares the next node 142 to the predefined condition at step 230 and processing returns to decisional step 224. Once there are no more nodes 142 to be filtered or if there was no filter aspect 135, then second aspect 135b selects first node 142 for nodal processing at step 232. Next, second aspect 135b determines a type (if one exists) of the selected node 142 at step 234. Next, DAG module 130 executes third aspect 135d based on the determined node type at step 236. Third aspect 135d then, at step 238, processes node 142 using any appropriate logic or algorithm. At decisional step 240, second aspect 135b determines if there are more nodes 142 to be processed. If there are more nodes 142, then second aspect 135b selects the next node 142 at step 242 and processing returns to step 234. Once all non-filtered nodes 142 have been processed, then the aspect-oriented processing ends and DAG module 130 determines if another DAG 140 is to be processed at decisional step 244. If there is, then the next DAG 140 is selected at step 246 and processing returns to step 208. Otherwise, processing ends.

The preceding flowchart and accompanying description illustrates exemplary methods of operation for implementing separate concerns involving effective exploration of DAG objects 140. However, this method is merely illustrative and system 100 contemplates DAG module 130 implementing any suitable techniques for suitably exploring or processing any DAG using some or all of the disclosed methods. Accordingly, any or all of these techniques may be used separately and/or together as appropriate to implement separate concerns for exploring DAGs in system 100. Moreover, because the flowcharts and descriptions are only illustrative, system 100 contemplates DAG module 130 using methods with additional steps, fewer steps, and/or different steps, in any order, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for concern-based processing of a directed acyclic graph (DAG) among one or more DAGs using aspect-oriented programming comprising:

instantiating a plurality of aspects for processing a DAG, each aspect of the plurality of aspects associated with one concern for processing the DAG, the DAG comprising a plurality of nodes, whereby the plurality of aspects have been separately coded in response to previously identified and subsequently removed concerns for processing the DAG, the plurality of aspects comprising:

a first aspect for determining the structure of the DAG, a second aspect operable to compare each node in a subset of the plurality of nodes to a condition and to remove the compared each node from the subset of the plurality of nodes that satisfies the condition, and a third aspect for processing the subset of the plurality of nodes based on the determined structure of the DAG and a type of each node of the subset of the plurality of nodes, the third aspect comprising an extension of the first aspect;

selecting the DAG from among the one or more DAGs; and processing the DAG based on at least the first and third aspects.

2. A computer-implemented method for concern-based processing of a directed acyclic graph (DAG) among one or more DAGs using aspect-oriented programming comprising:

instantiating a plurality of aspects for processing a DAG, each aspect of the plurality of aspects associated with one concern for processing the DAG, the DAG comprising a plurality of nodes, whereby the plurality of aspects have been separately coded in response to previously identified and subsequently removed concerns for processing the DAG;

selecting the DAG from among the one or more DAGs for processing;

instantiating a first aspect for determining the structure of the DAG;

instantiating a second aspect for processing at least one node among the plurality of nodes based on the determined structure of the DAG;

instantiating a third aspect for determining a subset of the plurality of nodes for processing, wherein the second aspect comprises an extension of the first aspect and the third aspect comprises an extension of the second aspect; and processing the DAG based on at least a portion of the instantiated aspects.

3. The computer-implemented method of claim 2, the third aspect comprising a filtering aspect operable to:

compare a first node of the subset of the plurality of nodes to a condition; and remove the first node from the subset of the plurality of nodes based on the first node satisfying the condition.

4. The computer-implemented method of claim 2, the third aspect operable to establish a pointcut for the DAG processing.

5. The computer-implemented method of claim 2, the first aspect further comprising at least one rule for traversing the DAG.

6. The computer-implemented method of claim 2, the second aspect comprising a plurality of pointcuts, each pointcut associated with one type of node.

7. The computer-implemented method of claim 2, the DAG comprising an XML tree structure.

8. A system for concern-based processing of a directed acyclic graph (DAG) among one or more DAGs using aspect-oriented programming comprising:

memory storing one or more DAGs; and a processor operable when executed to:

instantiate a plurality of aspects for processing a DAG, each aspect associated with one concern for processing the DAG, the DAG comprising a plurality of nodes, whereby the plurality of aspects have been separately coded in response to previously identified and subsequently removed concerns for processing the DAG, select the DAG from among the one or more DAGs for processing, instantiate a first aspect for determining the structure of the DAG, instantiate a second aspect for processing at least one node among the plurality of nodes based on the determined structure of the DAG, instantiate a third aspect for determining a subset of the plurality of nodes for processing, wherein the second aspect comprises an extension of the first aspect and the third aspect comprises an extension of the second aspect, and process the DAG based on at least a portion of the instantiated aspects.

9. The system of claim 8, the third aspect comprising a filtering aspect operable to:

compare a first node of the subset of the plurality of nodes to a condition; and remove the first node from the subset of the plurality of nodes based on the first node satisfying the condition.

10. The system of claim 8, the third aspect operable to establish a pointcut for the DAG processing.

11. The system of claim 8, the first aspect further comprising at least one rule for traversing the DAG.

12. The system of claim 8, the second aspect comprising a plurality of pointcuts, each pointcut associated with one type of node.

13. The system of claim 8, the DAG comprising an XML tree structure.

* * * * *